July 7, 1931.    R. E. HAPTONSTALL    1,813,739
TRANSMISSION MECHANISM
Filed July 25, 1928    2 Sheets-Sheet 2
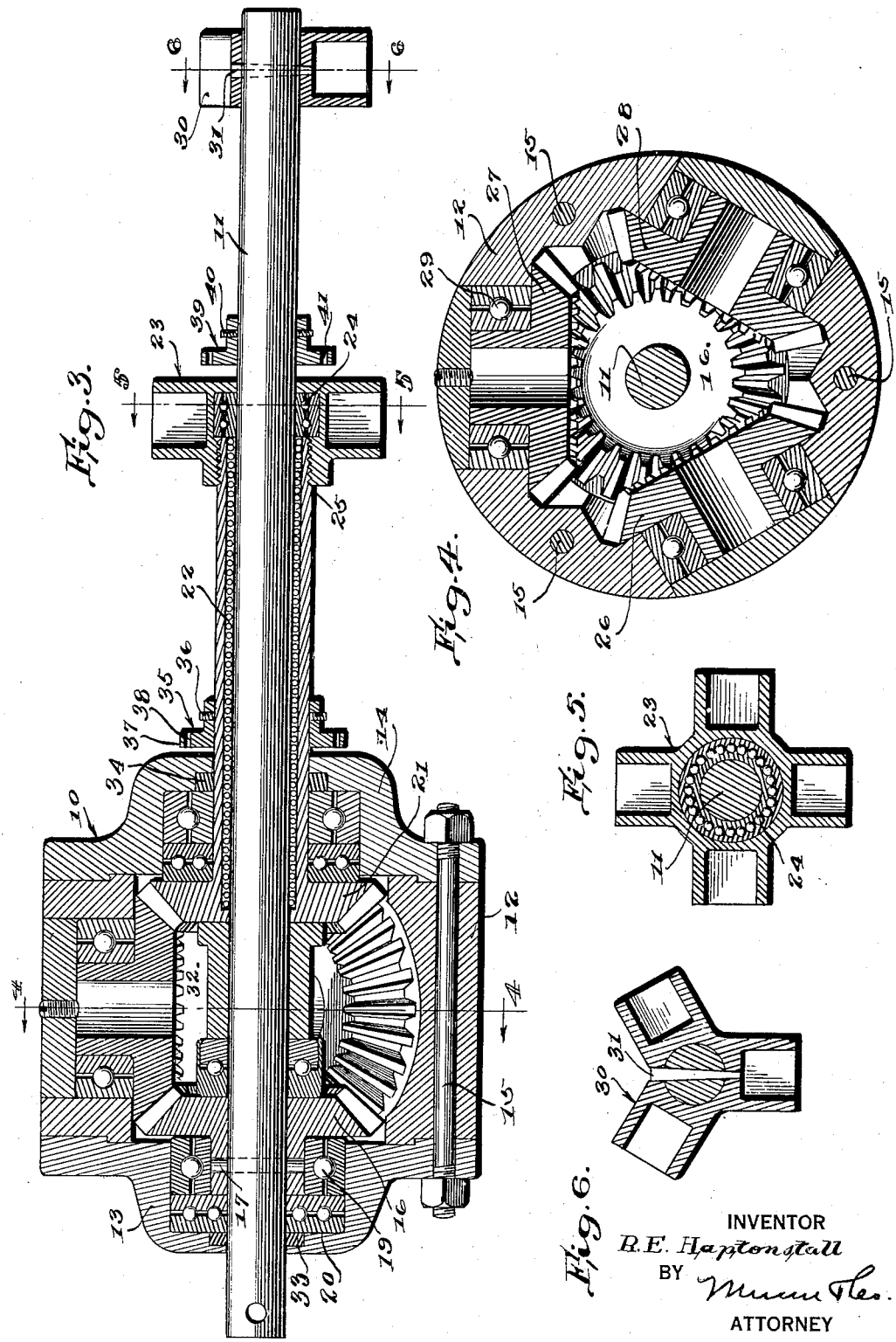
INVENTOR
R.E. Haptonstall
BY
ATTORNEY Patented July 7, 1931

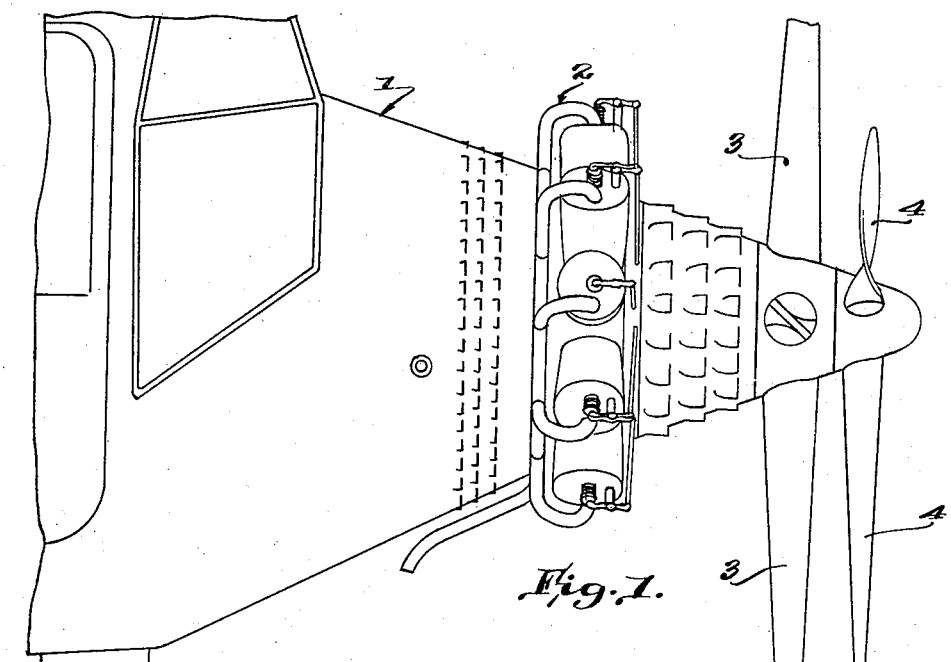
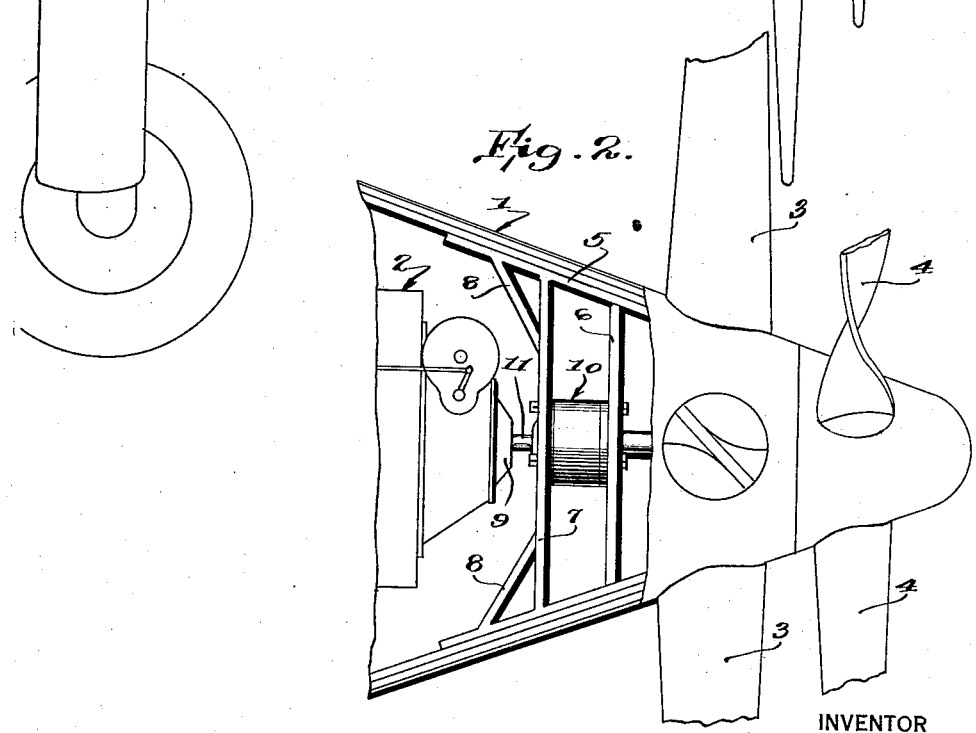

1,813,739

UNITED STATES PATENT OFFICE

ROY E. HAPTONSTALL, OF CHULA VISTA, CALIFORNIA

TRANSMISSION MECHANISM

Application filed July 25, 1928. Serial No. 295,300.

This invention relates to transmission mechanism and a primary object thereof is to provide mechanism of this character so constructed that the torque of the object driven will be overcome.

Another object is to provide simple and efficient means for transmitting motion from one member to another without the development of torque in either.

Another object is to provide a transmission mechanism including a plurality of gears two of which are drivers and which are so arranged that the drivers will travel in opposite directions.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a side elevation of the front end of an aeroplane to which this transmission is shown applied;

Fig. 2 is a plan view of the aeroplane nose with the casing removed to show the location of the transmission, parts being broken out for convenience in illustration;

Fig. 3 is a longitudinal vertical section of the transmission;

Fig. 4 is a vertical transverse section taken on the line 4—4 of Fig. 3;

Fig. 5 is a similar view taken on the line 5—5 of Fig. 3; and

Fig. 6 is still another view of like character taken on the line 6—6 of Fig. 3.

In the embodiment illustrated a front end or nose 1 of an aeroplane is shown having the usual motor 2 mounted thereon and provided with propeller blades 3 and 4 one arranged in advance of the other and which are designed to be driven by the transmission mechanism constituting this invention and indicated at 10 in Fig. 2, and which is in the form of a five gear transmission.

This transmission 10 is shown supported in a frame 5 including two transverse bars 6 and 7 to which the casing of the transmission is bolted, said bars being suitably braced as shown at 8. The main driving shaft 11 of the transmission is connected with the motor shaft by a universal joint indicated at 9.

While this transmission is primarily intended to overcome propeller torque in aeroplanes it yet may be used for various other purposes and is shown per se in Figs. 3 to 6.

This transmission 10 is shown mounted in a casing including a cylindrical body portion 12 and 13 and 14 secured together by a plurality of bolts 15, three of which are preferably used as shown clearly in Fig. 4.

The main driving shaft 11 extends entirely through the transmission and projects beyond opposite ends thereof, the rear end being connected as above described with the motor shaft by a universal joint indicated at 9 in Fig. 2 while the front end is designed to be connected with an object to be driven, a socket member 30 being here shown for such connection and which is shown secured to the shaft by wedge key 31. This socket member 30 may support the propeller blades 4 shown in Figs. 1 and 2 although obviously any other object to be rotated may be carried by this socket or any other connection may be substituted for it.

Located within the casing and fixed to the main shaft 11 is a driving gear 16, a pin 17 being here shown connecting it with the shaft by passing transversely therethrough. A ball bearing 19 is located between the stem of the driving gear 16 and the casing and thrust bearings 20 are arranged between the rear end of the gear shank and the casing.

In the front end of the casing of the transmission 10 is located another driving gear 21 which has made integral therewith a sleeve or tube 22 which encircles the main shaft 11 and carries an object to be rotated in a direction opposite to that carried by the socket 30. In this instance a socket member 23 may support the propeller blades 3 shown in Figs. 1 and 2 or any other object desired. This socket member 23 is shown threaded on the sleeve 22 and has a ball bearing 24 located between it and the shaft and other ball bearings 25 are located between the sleeve and the shaft as is shown clearly in Figure 3.

Three compensating gears 26, 27 and 28 are located in the transmission casing between the driving gears 16 and 21, all of the gears being bevelled and in mesh with each other as is shown clearly in Figs. 3 and 4, that is the driving gear 16 meshes with the compensating gears and the driving gear 21 also meshes with said compensating gears so that on the rotation of the shaft 11 the driving gear 16 turns in one direction and through the compensating gears operates the driving gear 21 and turns the sleeve or tube 22 in a direction opposite to that in which the shaft 11 is driven.

There are no internal bracing structures such as spiders, plates, rods, etc., between the compensating gears 26, 27 and 28. These gears maintain their position by shanks attached to the compensating gears and by reason of the fact that all the gears are right angle bevelled gears which are always pushing against one another when in motion and held by their own respective shanks and bearings when not in motion.

Ball bearings indicated at 29 are provided between the shanks of the various compensating gears and their support.

An oil chamber 32 is formed in the space between the gears as shown clearly in Fig. 3 and is kept filled with a suitable lubricating oil so that these gears and the ball bearings are effectively lubricated at all times. Suitable packings 33 and 34 are arranged around the shaft 11 at the ends of the casing to prevent leakage of the oil past these points.

A thrust collar 35 for the casing 10 is mounted on the tube 22 and secured by suitable set screws 36. This collar has an annular flange 37 provided with a plurality of openings 38 designed for the attachment of brace wires.

A similar collar 39 is secured to the shaft 11 outside the object holding member 23 and similarly secured to said shaft by set screws 40 it being provided with openings 41 to receive brace wires, not shown.

From the above description it will be obvious that when parts are assembled as shown in Figs. 3 and 4 and rotary motion is transmitted to the shaft 11 from a suitable source this motion will be imparted to the gear 16 which will transmit it through the three compensating gears 26, 27 and 28 to the gear 21 and turn said gear 21 in a direction opposite to that in which the gear 16 turns. This gear 21 is made integral with the tubing 22 and will turn said tubing with it and impart motion to the member 23 which carries the object to be rotated.

It will thus be seen that by means of this transmission mechanism 10 two members carried respectively by the holders 23 and 30 may be turned in opposite directions and utilized for any desired purpose.

It will thus be seen that this transmission encompasses a maximum of simplicity, balance, efficiency, and durability due to the fact that the transmission itself has only five gears which are all of the same size, with the bearings of the compensating gears all the same size, resulting in even wear throughout and avoiding the subjection of one part to more strain and wear than the other part, equalizing the tension and creating a maximum balance with a minimum of working parts and a minimum of weight.

Without further description it is thought that the features and advantages of the invention will be readily apparent to those skilled in the art, and it will, of course, be understood that changes in the form proportion and minor details of construction may be resorted to, without departing from the spirit of the invention or its scope as claimed.

I claim:

1. A five-gear transmission, in which all gears are of the same size, a case to house said transmission, a drive shaft extending through said case adapted to carry an object to be driven, a right angle gear fixed to said drive shaft within said case, a tubular shaft encircling said drive shaft and extending through one end of said case, and adapted to carry an object to be driven, a second right angle gear fixed to said tubular shaft within said case, ball bearings mounted between said drive shaft and said tubular shaft, a tube encircling said drive shaft and spaced between the right angular gear on said drive shaft and the right angular gear on the tubular shaft within said case, three right angle compensating gears mounted in ball bearings in the side wall of said case, and spaced apart at intervals in triangular form within said case meshing with the driving gears fixed to said shaft and said tubular shaft within the case.

2. A five-gear transmission, in which all gears are of the same size, a case to house said transmission, a drive shaft extending through said case adapted to carry an object to be driven, a right angle gear fixed to said drive shaft within said case, a tubular shaft encircling said drive shaft and extending through one end of said case and adapted to carry an object to be driven, a second right angle gear fixed to said tubular shaft within said case, ball bearings mounted between said drive shaft and said tubular shaft, a tube encircling said drive shaft and spaced between the right angular gear on said drive shaft and the right angular gear on the tubular shaft within said case, three right angle compensating gears mounted in ball bearings in the side wall of said case, and spaced apart at intervals in triangular form within said case meshing with the driving gears fixed to said shaft and said tubular shaft within the case, an oil chamber in said case for lubricating all of said gears and bearings, a chamber for the ball bearings for the drive shaft at one end of said case and a chamber for the ball bearings for the drive shaft and for the tubular shaft in the other end of said case.

3. A five-gear transmission, in which all gears are of the same size, a case to house said transmission, a drive shaft extending through said case adapted to carry an object to be driven, a right angle gear fixed to said drive shaft within said case, a tubular shaft encircling said drive shaft and extending through one end of said case and adapted to carry an object to be driven, a second right angle gear fixed to said tubular shaft, within said case, ball bearings mounted between said drive shaft and said tubular shaft, a tube encircling said drive shaft and spaced between the right angular gear on said drive shaft and the right angular gear on the tubular shaft within said case, three right angle compensating gears mounted in ball bearings in the side wall of said case, and spaced apart at intervals in triangular form within said case meshing with the driving gears fixed to said shaft and said tubular shaft within the case, said transmission case consisting of three pieces, a plate for shaft bearing and right angle drive gear on one end, a cylindrical body portion for compensating gears and oil chamber in the center, and a second plate for shaft bearings and right angular drive gear on the tubular shaft on the other end, and means for holding said parts together.

Signed at Chula Vista in the county of San Diego and State of California, this 17th day of July A. D. nineteen hundred and twenty-eight.

ROY E. HAPTONSTALL.